May 22, 1973 S. KNECHT ET AL 3,734,804
ROTARY CUTTER AND STRIP FEEDING ARRANGEMENT
Filed Dec. 17, 1970 2 Sheets-Sheet 1
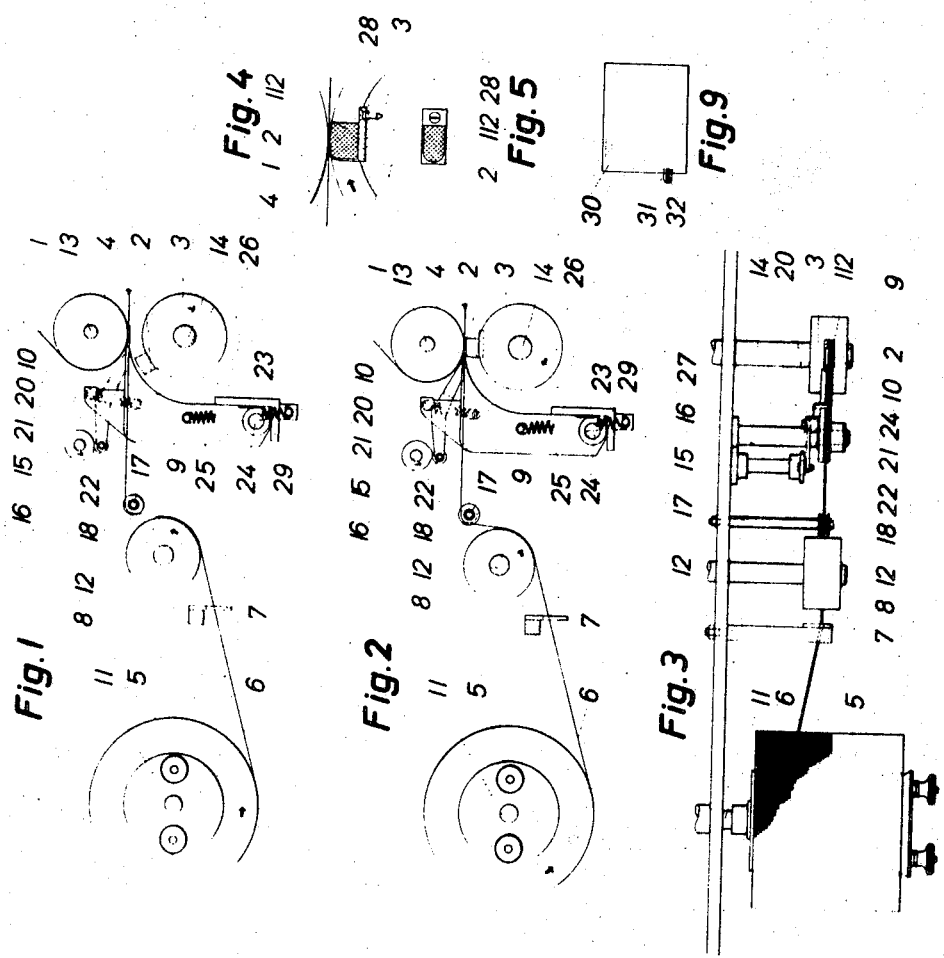
INVENTORS
SIEGFRIED KNECHT
HELMUT DEMN
BY
Nolte & Nolte
ATTORNEY.

United States Patent Office 3,734,804
Patented May 22, 1973

3,734,804
ROTARY CUTTER AND STRIP FEEDING ARRANGEMENT
Siegfried Knecht and Helmut Demny, Gevelsberg, Germany, assignors to Maschinenfabrik Alfred Schmermund, Gevelsberg, Germany
Filed Dec. 17, 1970, Ser. No. 99,029
Claims priority, application Germany, Nov. 11, 1969,
P 19 56 531.2
Int. Cl. B32b 31/18
U.S. Cl. 156—518                    13 Claims

ABSTRACT OF THE DISCLOSURE

A rotary cutter and strip feeding arrangement is disclosed.

The arrangement is provided with a cutter blade which is filled with rubber projecting beyond the cutting edge of the blade. The cutter blade is mounted on a rotating roller with the cutting edge thereof disposed parallel to the circumferential surface of the roller. The cutter blade co-operates with a counter-roller which feeds a web of cellophane provided with a welded-on tear-open strip to the rotating cutter and which provides a counter surface against which the rotating cutter blade periodically cuts-out a tongue shaped portion from the cellophane web. A length of self-adhesive coloured strip material is periodically contacted by the rotating rubber pad and pressed thereby against the moving web of cellophane so as to be drawn between the two rollers and periodically severed by the cutter blade.

BACKGROUND OF THE INVENTION

The present invention relates to a rotary cutter arrangement, especially an arrangement for simultaneously cutting-out tongue shaped portions of strip material and severing lengths of coloured strip material and applying the severed lengths to the tongue shaped portions.

The gripping tongue on objects packed with packing material of this kind, for example cigarette packets, can frequently be found only with great difficulty, so that the packet is often opened inexpertly.

SUMMARY OF THE INVENTION

According to one aspect of the present invention, there is provided a packing web of substantially transparent plastic film material provided with a welded-on tear-open strip and a cut-out gripping tongue, wherein the gripping tongue is made conspicuous by the application to only the gripping tongue of a length of coloured strip material.

According to another aspect of the present invention, there is provided an arrangement comprising a first rotatable roller for feeding a first strip material, at least one cutter blade having a cutting edge adapted to cut-out tongue-shaped portions of the first strip material and mounted on the circumference of a second rotatable roller to cooperate with the circumferential surface of the first roller, a pad of resilient material mounted on said cutter blade and projecting from the cutting edge thereof, guide and feed means for guiding and feeding second strip material along a path towards the first and second rollers, the arrangement being such that on rotation of the first and second rollers the first strip material is fed between the first and second rollers, the rotating pad periodically contacts the second strip material to press the second strip material against the first strip material and to draw the second strip material between the first and second rollers, and the cutter blade cuts-out tongue-shaped portions of the first strip material and severs portions of predetermined length from the second strip material substantially simultaneously.

BRIEF DESCRIPTION OF THE DRAWINGS

Embodiments of the invention will now be more particularly described with reference to the accompanying drawings, in which:

FIG. 1 shows an elevational view of a rotary cutter and strip feed arrangement, wherein the rotary cutter is in a first operative position;

FIG. 2 shows the rotary cutter and strip feed arrangement of FIG. 1, wherein the rotary cutter is in a second operative position;

FIG. 3 shows a plan view of the arrangement of FIG. 2, with some components removed in the interest of clarity;

FIG. 4 shows to an enlarged scale a detail of the arrangement of FIG. 2;

FIG. 5 shows a plan view of the cutter blade of FIG. 4;

FIG. 9 shows a web of material provided with a cut-out gripping tongue embodying the invention.

DESCRIPTION OF THE PREFERRED EMBODIMENTS

Figure 6:
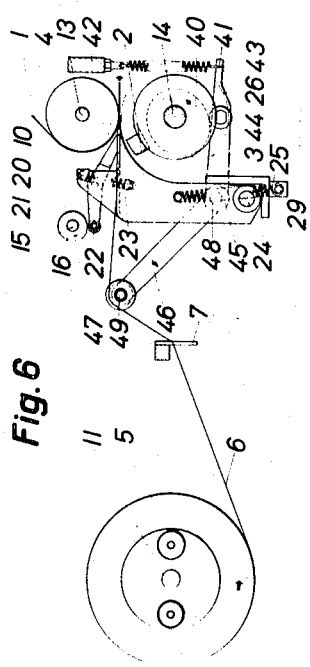
FIG. 6 shows an arrangement similar to that of FIG. 1, but incorporating a modified strip feed arrangement.

Referring now to the drawings, FIG. 1 shows a rotary cutter and strip feed arrangement wherein a web 1 of cellophane having a welded-on tear-open strip is fed into the arrangement by means of a first rotatable roller 4 mounted on a shaft 13 and a co-operating rotatable cutter blade 2. The cutter blade 2 is rigidly attached to the circumference of a second rotatable roller 3, which is rigidly attached to a rotatable drive shaft 14. FIG. 4 illustrates the cutter blade 2 to an enlarged scale and shows the means by which it is secured on the circumference of the roller 3. FIG. 5 shows a plan view of the cutter blade 2 and, as can be seen from FIG. 5, the edge of the cutter blade defines a U-shaped cavity which is filled with a pad of resilient material, such as rubber, indicated by the reference numeral 112. The pad of rubber filling 112 projects slightly beyond the cutting edge of the cutter blade 2. As shown in FIG. 4, the cutter blade 2 is mounted in a recess in the circumferential surface of the roller 3 and is attached thereto by means of a screw 28.

Referring again to FIG. 1, the arrangement is provided with a magazine spool 5, which is rotatably mounted on a shaft 11. The spool 5 contains a quantity of coloured strip material 6, which is provided with an adhesive coating on one surface thereof.

This marking thread 6 is passed through a first thread guide 7, passes over a rotatable pull-off drum 8, which is intermittently driven by means of a drive shaft 12, over a free-running guide pulley 18, rotatably mounted on a shaft 17, and then passes along an open channel in the surface of a pivotable thread guide device 9.

The magazine spool 5 is preferably arranged to contain some five or six days supply of the marking thread 6 and, when the spool requires replacing, a return lock 10 is released, the thread guide device 9 is pivotally displaced against a retaining spring 25 about its pivot 24 in a direction away from the roller 3 so as to facilitate the insertion of the end of the new reel of marking thread 6 into the thread guide device 9. The marking thread 6 is arranged to project some eight or nine millimetres beyond the end of the open guide channel in the thread guide device 9, the return-lock 10 is re-engaged, and the device 9 is then pivoted back into its operative position shown in FIG. 1.

The device 9 is located in its operative position in contact with a support 29 and is retained therein by the spring 25.

On rotation of the roller 3, the cutter blade 2 describes a circular path indicated by the broken line 26 and, in so doing, the resilient filling material 112 periodically contacts the projecting end portion of the marking thread 6 and draws it towards the rollers 3 and 4 and, at the same time, presses the marking thread 6 against the surface of the web 1, which is being fed in the direction indicated by the arrow between the rollers 3 and 4. The U-shaped cutter blade 2 cuts-out a correspondingly shaped tongue portion from the welded-on tear-open strip on the web 1 and, substantially simultaneously, severs the marking thread 6 so as to leave a portion thereof adherent to the tongue portion.

The sequence of events which have been described above recur periodically as the rollers 3 and 4 rotate. In FIG. 1, the cutter blade 2 is shown approaching the point on its circular path 26 where it contacts the end portion of the marking thread 6 which projects from the thread guide device 9. During the period when the marking thread 6 is not in contact with the rubber filling 112, it is restrained from slipping back by the return-lock 10. This return-lock 10 comprises a double armed lever which is pivotally mounted by means of a boss 20 on a support projecting from the body of the thread guide device 9. One arm 21 of this double armed lever carries a roller 22 which engages the profile of a rotatable control cam 16 mounted on a drive shaft 15. The cam 16 rotates in the direction indicated by the arrow and, periodically, lifts the return-lock 10 against a spring 23 so as to free the thread 6 and enable it to be drawn forward by contact with the rubber filling 112.

FIG. 2 shows the rotary cutter and strip feed arrangement of FIG. 1 when the cutter blade 2 has reached its cutting position and when, as shown in FIG. 2, the radially projecting portion of the cam profile 16 has lifted the return lock 10 so as to free the thread 6. On further rotation of the cutter blade 2 beyond the position shown in FIG. 2, the return-lock 10 is again lowered so as to restrain the thread 6 from slipping back. During the period when the return lock secures the thread 6, the intermittently operable pull-off drum 8 is rotated by means of its drive shaft 12 to pull an appropriate length of the marking thread 6 from the magazine spool 5. This action produces a supply of marking thread 6, which is held as slack until the return-lock 10 is again lifted and the marking thread 6 is drawn forward by being pressed against the web 1 by the rubber filling 112.

Apart from the positions of the cutter blade 2 and of the return lock 10, FIGS. 1 and 2 are identical and corresponding components in the two figures are indicated by the same reference numerals.

FIG. 3 shows a plan view of the arrangement of FIG. 2, with the web 1 and the feed roller 4 removed in the interests of clarity of illustration. All the components in FIG. 3, which correspond with those of FIG. 2 are indicated by the same reference numerals, and FIG. 3 additionally shows a support 27.

Figure 7:
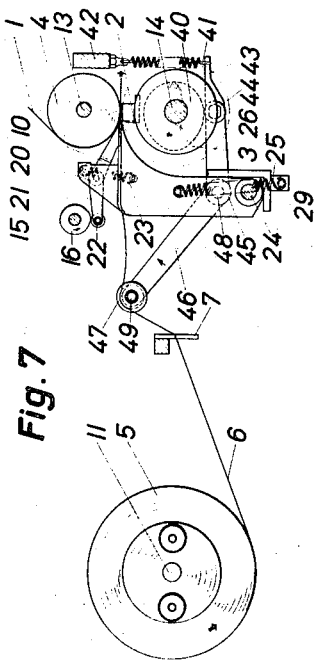
FIG. 7 shows the rotary cutter and strip feed arrangement of FIG. 6, wherein the rotary cutter is in its second operative position.
Figure 8:
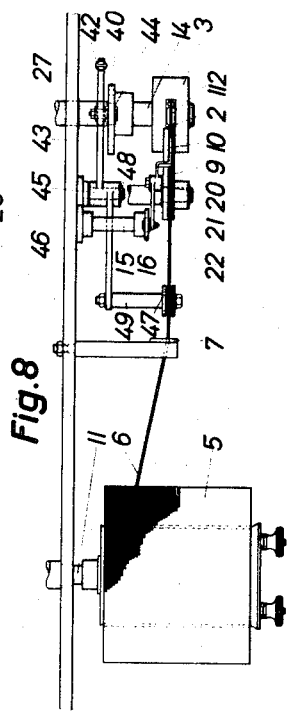
FIG. 8 shows a plan view of the arrangement of FIG. 7, with some components removed in the interest of clarity.

FIGS. 6, 7 and 8 show a rotary cutter arrangement which is similar to that shown in FIGS. 1, 2 and 3 except that, in FIGS. 6, 7 and 8, the intermittently operated pull-off drum 8 is replaced by displaceable pull-off roller 47. In FIGS. 6, 7 and 8, the thread 6 is pulled-off the magazine spool 5 in response to a pivotal movement of the pull-off roller 47. This roller is mounted on a stub shaft 49 which projects from one end of an arm 46 of a double-armed lever 46, 43. The double-armed lever 46, 43 is pivotally mounted on a pivot 48 by means of a boss 45. The arm 43 carries a cam follower 44, which contacts the profile of a control cam 40 rigidly mounted on the drive shaft 14, which also carries the roller 3. The cam follower 44 is maintained in contact with the cam 40 by a spring 41 which extends between one end of the arm 43 and a support 42. As the drive shaft 14 rotates, the cam 40 imparts periodical rocking motion to the double-armed level 46, 43 so as to cause the thread 6 to be pulled-off the magazine spool 5 during periods when the return-lock 10 is operative. This produces the requisite amount of slack in the thread 6 to provide a supply of thread which is, subsequently, pulled through the thread guide device 9 as the return-lock 10 is lifted and the thread 6 contacts the rotating rubber filling 112.

In both the arrangements shown in FIGS. 1 to 3 and in FIGS. 6 to 8, the length of the severed portion of the coloured marking thread 6, which is bonded to the cut-out gripping tongue by being pressed against it by the rubber pad 112, is determined by the length of the pad of rubber filling 112.

FIG. 9 shows a packing web of cellophane 30, provided with a cut-out tongue 31 which has been rendered conspicuous by bonding to it a length of coloured marking thread 32 which has been provided with an adhesive coating.

A packet wrapped with a packing web embodying the invention provides a gripping tongue which is made readily noticeable through the application of a marking thread which is rendered conspicuous by virtue of the fact that its colour stands out, so that there is no longer any need to search for the gripping tongue.

As has been described, a marking thread of this kind can be very simply applied to the gripping tongue by filling the cavity of a U-shaped cutter, which is disposed on a rotating roller and co-operates with a counter-roller for the purpose of cutting out the gripping tongue, with a pad of rubber or similar material. Preferably, the marking thread is drawn-off from a magazine spool and fed forward intermittently. The marking thread is pulled in between the rotating rollers by the projecting rubber filling material, pressed against the tear-open strip, and cut to length by the cutter simultaneously with the cutting out of the tongue. An existing conventional rotary cutting device can thus be adapted in a simple manner for the additional marking of the gripping tongue by replacing the usual cutters by cutters filled with rubber or similar resilient material. In addition, the proposed type of marking provides the advantage that the marking is effected only in the position occupied by the gripping tongue of the tear-open strip. The application of a marking thread or marking strip over the entire length of the tear-open strip would entail unnecessary wastage of material.

We claim:

1. An arrangement comprising in combination;
    a source of first strip material;
    a source of second strip material;
    a first rotatable roller;
    a second rotatable roller;
    drive means to rotate said first and second rollers;
    guide and feed means to guide and feed said second strip material along a path towards said first and second rollers;
    at least one cutter blade having a cutting edge adapted to cut-out tongue-shaped portions of said first strip material and defining walls of a cavity in said cutter blade; and
    a pad of resilient material mounted in said cavity and projecting from said cutting edge;
    said cutter blade being rigidly mounted on the circumference of said second roller to co-operate with the circumferential surface of said first roller and said cutting edge being disposed substantially parallel to the circumferential surface of said second roller;
    said pad mounted in said cavity in said rotating cutter blade periodically contacting said second strip material to press said second strip material against said first strip material and to draw said second strip material between said first and second rollers, and said cutter blade substantially simultaneously cutting-out said tongue-shaped portions from said first strip material and severing portions of predetermined length from said second strip material.

2. An arrangement comprising in combination:
a source of first strip material;
a source of second strip material;
a first rotatable roller;
a second rotatable roller;
drive means to rotate said first and second rollers;
guide and feed means to guide and feed said second strip material along a path towards said first and second rollers;
at least one cutter blade having a cutting edge of substantially U-shaped profile adapted to cut-out tongue-shaped portions of said first strip material and defining a cavity in said cutter blade between the limbs of said profile; and
a pad of resilient material mounted in said cavity and projecting from said cutting edge;
said cutter blade being rigidly mounted on the circumference of said second roller to co-operate with the circumferential surface of said first roller and said cutting edge being disposed substantially parallel to the circumferential surface of said second roller;
said first roller on being rotated by said drive means feeding said first strip material between said first and second rollers;
said pad mounted in said cavity in said rotating cutter blade periodically contacting said second strip material to press said second strip material against said first strip material and to draw said second strip material between said first and second rollers, and said cutter blade substantially simultaneously cutting-out said tongue-shaped portions from said first strip material and severing portions of predetermined length from said second strip material; and
said guide and feed means comprising at least one guide device located in said path of said second strip material upstream of said first and second rollers, said at least one guide device comprising a periodically operating return-lock to restrain said second strip material from displacement in a direction away from said first and second rollers during periods when said second strip material is not in contact with said pad of resilient material.

3. An arrangement as defined in claim 1, wherein said cutting edge is of substantially U-shaped profile and said cavity is defined by the limbs of said profile.

4. An arrangement as defined in claim 1, wherein the predetermined length of each of said severed portions of said second strip material is substantially equal to the length of said pad of resilient material in said cavity.

5. An arrangement as defined in claim 1, wherein said second source comprises a magazine spool and said guide and feed means comprise a rotatable pull-off drum located between said magazine spool and said first and second rollers and in said path of said second strip material.

6. An arrangement as defined in claim 5, comprising intermittently operating drive means to intermittently angularly displace said pull-off drum to extract said second strip material intermittently from said magazine spool and feed said second strip material towards said first and second rollers.

7. An arrangement as defined in claim 1, wherein said second source comprises a magazine spool and said guide and feed means comprise a pull-off pulley mounted on an angularly displaceable arm and located in said path of said second strip material between said magazine spool and said first and second rollers.

8. An arrangement as defined in claim 7, comprising displacement means to angularly displace said arm periodically in predetermined co-ordinated relationship with the rotation of said cutter blade to extract said second strip material intermittently from said magazine pool and feed said second strip material towards said first and second rollers.

9. An arrangement as defined in claim 8, wherein said displacement means comprises a cam attached to said second roller to rotate therewith, a follower co-operating with said cam and attached to a further arm coupled to said angularly displaceable arm.

10. An arrangement as defined in claim 9, wherein said angularly displaceable arm and said further arm comprise the respective arms of an angle-lever.

11. An arrangement as defined in claim 1, wherein said guide and feed means comprise at least one guide device located in said path of said second strip material upstream of said first and second rollers, said at least one guide device comprising a periodically operating return-lock to restrain said second strip material from displacement in a direction away from said first and second rollers during periods when said second strip material is not in contact with said pad of resilient material.

12. An arrangement as defined in claim 11, comprising a further rotatable cam co-operating with said return-lock to co-ordinate the periodic operation thereof with the rotation of said cutter blade.

13. An arrangement as defined in claim 11, wherein said at least one guide device is pivotally mounted on a support, whereby said guide device may be angularly displaced away from its operating position, in which it is located immediately adjacent said first and second rollers, to facilitate the feeding of a new length of said second strip material through said guide device.

References Cited
UNITED STATES PATENTS

| | | | |
|---|---|---|---|
| 1,864,764 | 6/1932 | Rundell | 156—519 |
| 2,133,341 | 10/1938 | Bronander | 156—520 X |
| 3,302,490 | 2/1967 | Bishop | 93—1 G |
| 3,503,309 | 3/1968 | Jones | 93—36 A |

JACOB H. STEINBERG, Primary Examiner

U.S. Cl. X.R.

93—36 A; 156—258, 519; 161—39